United States Patent
Boisset et al.

(10) Patent No.: US 12,476,818 B2
(45) Date of Patent: Nov. 18, 2025

(54) METHOD FOR PREVENTING IDENTITY THEFT FOR A SPECIFIC ELECTRONIC CONTROL UNIT OF A MOTOR VEHICLE

(71) Applicant: Continental Automotive Technologies GmbH, Hannover (DE)

(72) Inventors: Jean-Philippe Boisset, Toulouse (FR); Mounir Elorch, Toulouse (FR); Abir Bourounia, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 95 days.

(21) Appl. No.: 18/575,428

(22) PCT Filed: Jul. 1, 2022

(86) PCT No.: PCT/EP2022/068242
§ 371 (c)(1),
(2) Date: Dec. 29, 2023

(87) PCT Pub. No.: WO2023/280699
PCT Pub. Date: Jan. 12, 2023

(65) Prior Publication Data
US 2024/0313974 A1    Sep. 19, 2024

(30) Foreign Application Priority Data
Jul. 6, 2021 (FR) ........................... 2107276

(51) Int. Cl.
*H04L 9/40* (2022.01)
*H04L 9/08* (2006.01)
*H04L 9/32* (2006.01)

(52) U.S. Cl.
CPC .......... *H04L 9/3236* (2013.01); *H04L 9/0825* (2013.01)

(58) Field of Classification Search
CPC ..... H04L 9/3236; H04L 9/0825; H04L 12/40; H04L 12/4135; H04L 2012/40215; H04L 63/12; G06F 13/4282
See application file for complete search history.

(56) References Cited

U.S. PATENT DOCUMENTS 9,705,678 B1 * 7/2017 Wang ..................... G06F 21/602
2016/0330032 A1 * 11/2016 Naim ..................... G06F 21/85

OTHER PUBLICATIONS

Xu et al., "Lightweight Secure Communication Protocols for In-Vehicle Sensor Networks", pp. 19-30, 2013 (Year: 2013).*

(Continued)

*Primary Examiner* — Thaddeus J Plecha
(74) *Attorney, Agent, or Firm* — Buchanan Ingersoll & Rooney PC

(57) ABSTRACT

A method for preventing identity theft for a specific electronic control unit of a motor vehicle, when the specific electronic control unit sends a plaintext message, which contains measurement data, to a central electronic control unit of the motor vehicle. The method includes: generating an identifier for selecting a hashing algorithm; acquiring at least one parameter common to the central electronic control unit and the specific electronic control unit; generating a first digital hashing fingerprint of the combination of the plaintext message and of the common parameter, from the identifier for selecting a hashing algorithm; forming a data frame that includes the plaintext message, the identifier for selecting a hashing algorithm and the first digital hashing fingerprint; and sending the data frame to the central electronic control unit.

10 Claims, 2 Drawing Sheets

(56) References Cited

OTHER PUBLICATIONS

"IEEE Guide for Wireless Access in Vehicular Environments (WAVE) Architecture ; IEEE Std 1609.0-2019 (Revision of IEEE Std 1609.0-2013)" IEEE Standard, IEEE, Piscataway, NJ USA, Apr. 10, 2019, pp. 1-106, [retrieved on Apr. 10, 2019].

Halabi et al., "A Lightweight Synchronous Cryptographic Hash Chain Solution to Securing the Vehicle CAN bus," 2018 IEEE International Multidisciplinary Conference on Engineering Technology (IMCET), IEEE, Nov. 14, 2018, 6 pages.

Park et al., "A Secure Communication Method for CANBus," 2021 IEEE 11th Annual Computing and Communication Workshop and Conference (CCWC), IEEE, Jan. 27, 2021, pp. 0773-0778.

Islinger, T., "Autosar SecOC for CAN FD" CAN Newsletter, Mar. 31, 2017, 2 pages, Retrieved from the Internet: https://can-newsletter.org/uploads/media/raw/d904c 90ba599c668e9758ae558dcb845.pdf [retrieved on Mar. 11, 2022].

Fouque et al., On the Security of the CCM Encryption Mode and of a Slight Variant, Advances in Databases and Information Systems; [Lecture Notes in Computer Science; Lect. Notes Computer]. Springer International Publishing, Cham, Jun. 3, 2008, 18 pages.

Praneeth et al., "Understanding CTR with CBC-MAC Protocol (CCMP) AES• CCMP in depth" May 2, 2020, pp. 1-12, Retrieved from the Internet: https://praneethwifi.in/2020/05/02/ctr-with-cbc-ma c-protocol-ccmp-aes-ccmp/ [retrieved on Jun. 2, 2022].

International Search Report and Written Opinion for International Application No. PCT/EP2022/068242, mailed Oct. 24, 2022, 18 pages.

International Search Report and Written Opinion for International Application No. PCT/EP2022/068242, mailed Oct. 24, 2022, 16 pages (French).

French Search Report for French Application No. 2107276, dated Mar. 11, 2022 with translation, 11 pages.

* cited by examiner

METHOD FOR PREVENTING IDENTITY THEFT FOR A SPECIFIC ELECTRONIC CONTROL UNIT OF A MOTOR VEHICLE

CROSS REFERENCE TO RELATED APPLICATIONS

This application is the U.S. National Phase Application of PCT International Application No. PCT/EP2022/068242, filed Jul. 1, 2022, which claims priority to French Patent Application No. 2107276, filed Jul. 6, 2021, the contents of such applications being incorporated by reference herein.

FIELD OF THE INVENTION

The invention relates to techniques for preventing identity theft in automotive systems. More specifically, the invention relates to a method for preventing identity theft for a specific electronic control unit of a motor vehicle, when the specific electronic control unit sends a plaintext message, which contains measurement data, to a central electronic control unit of the motor vehicle.

BACKGROUND OF THE INVENTION

Tire pressure sensors, called TPMS (Tire Pressure Monitoring System) sensors, arranged on the rim of a motor vehicle regularly transmit measurement data to a central unit of the motor vehicle via a radio frequency link on a specific frequency carrier (for example, 433 MHz or 2.4 GHz). This data is sent in a plaintext message, and the authenticity of the sender cannot be verified, i.e., the origin of the message.

Thus, a malicious third party (or attacker) could pose as such a sensor and send false messages that the central unit of the motor vehicle would interpret as valid and understandable.

However, such a possibility can be dangerous for the passengers in the motor vehicle.

Indeed, these false messages would allow a pressure anomaly to be simulated in order to force the motor vehicle to stop and lead, for example, to a "car jacking" type of crime.

Furthermore, these false messages can hide a real pressure anomaly and thus compromise the safety of the passengers in the motor vehicle.

Solutions have been proposed that involve encrypting the measurement data using a private or symmetrical key sent by the central unit of the motor vehicle to the sensor, when pairing, for example, so that the data can only be encrypted by the authorized sensor. In this case, measurement data encrypted in this way can be decoded by any entity receiving it that is in possession of the public or symmetrical key.

However, this solution has the disadvantage of requiring the key to be periodically refreshed in order to prevent any information learned in the past from helping an attacker in future periods.

In short, the authenticity of the sent messages needs to be guaranteed.

It is also necessary to check the integrity of the sent messages.

Finally, it is also necessary to prevent identity theft of a sensor of a motor vehicle.

SUMMARY OF THE INVENTION

An aspect of the invention aims to overcome these disadvantages.

To this end, an aspect of the invention proposes a method for preventing identity theft for a specific electronic control unit of a motor vehicle, when the specific electronic control unit sends a plaintext message, which contains measurement data, to a central electronic control unit of the motor vehicle, the central electronic control unit comprising at least one database that stores at least one tuple of values, formed by an identifier for selecting a hashing algorithm and a hashing algorithm. The method comprises the following steps, implemented on the specific electronic control unit:

generating an identifier for selecting a hashing algorithm;
acquiring at least one evolutive parameter common to the central electronic control unit and the specific electronic control unit;
generating a first digital hashing fingerprint of the combination of the plaintext message and of the common parameter, from the identifier for selecting a hashing algorithm;
forming a data frame that includes the plaintext message, the identifier for selecting a hashing algorithm (hi) and the first digital hashing fingerprint; and
sending the data frame to the central electronic control unit.

In one embodiment, the method can further comprise the following steps, implemented on the central electronic control unit, in response to receiving the data frame:

extracting the plaintext message and the identifier for selecting a hashing algorithm from the data frame;
acquiring the evolutive parameter common to the central electronic control unit and the specific electronic control unit;
generating a second digital hashing fingerprint of the combination of the plaintext message and of the common parameter, from the identifier for selecting a hashing algorithm;
comparing the first digital fingerprint and the second digital fingerprint; and
using the measurement data of the plaintext message depending on the comparison.

In one embodiment, the method can further comprise the following steps:

encrypting, by the specific electronic control unit, the first digital hashing fingerprint with a secret private key of the specific electronic control unit, before forming the data frame; and
decrypting, by the specific electronic control unit, the first digital hashing fingerprint with a public key of the specific electronic control unit that is associated with the secret private key of the specific electronic control unit, before comparing the first digital fingerprint and the second digital fingerprint.

For example:

the secret private key of a public key/secret private key pair is used, depending on a parameter for selecting an asymmetric encryption key that is introduced into the data frame; and
the public key of the public key/secret private key pair is used, depending on the parameter for selecting an asymmetric encryption key that is extracted from the data frame.

In one example, the method can further comprise the following step of:

deleting, by the specific electronic control unit, a CRC field of the plaintext message that contains a CRC sequence, before forming the data frame.

The method can also further comprise the following step of:

searching, by the central electronic control unit, in the database for the hashing algorithm associated with the identifier for selecting a hashing algorithm, before generating the second digital hashing fingerprint.

In one embodiment, provision can be made, on the specific electronic control unit, for the identifier for selecting a hashing algorithm to be a random index that is associated with a specific position in a predetermined list of hashing algorithms, with the list being stored in a memory of the specific electronic control unit.

For example, the random index can be generated before each data frame is sent.

In one embodiment, the common parameter is selected from among: a counter, a pseudo-random generator and a clock.

For example, on the specific electronic control unit and on the central electronic control unit, the value of the common parameter is renewed at predetermined intervals.

BRIEF DESCRIPTION OF THE DRAWINGS

Further features and advantages of aspects of the invention will become more clearly apparent from reading the following description. This description is purely illustrative and should be read with reference to the accompanying drawings, in which.

The figures are not necessarily to scale, notably in terms of thickness, for the sake of illustration.

DETAILED DESCRIPTION OF THE PREFERRED EMBODIMENTS

Figure 1:
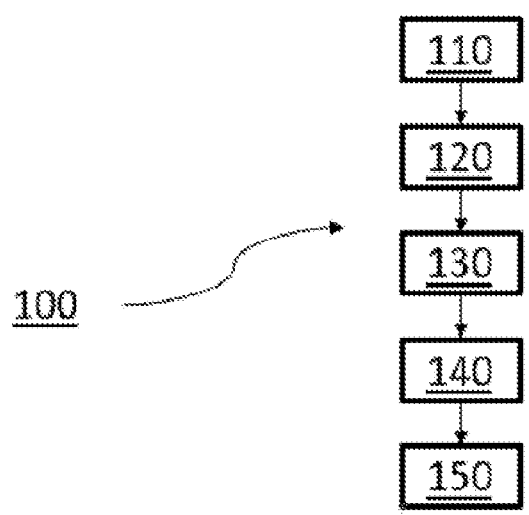
FIG. 1 shows a method according to an aspect of the invention when it is implemented on a specific electronic control unit.

FIG. 1 illustrates a method 100 for preventing identity theft for a specific electronic control unit of a motor vehicle. In particular, when the specific electronic control unit sends a plaintext message M, which contains measurement data, to a central electronic control unit of the motor vehicle.

An electronic control unit is understood to mean a microprocessor, a PLC or a controller that is adapted to control the operation of the systems of the motor vehicle, such as the powertrain, the air conditioning system, the infotainment system, the bodywork systems, the chassis systems, the systems of the TPMS (Tire Pressure Monitoring System) units and the like.

In an aspect of the invention, a central electrical control unit controls the overall operation of the motor vehicle, while a specific electronic control unit controls the operation of at least one of the systems of the motor vehicle.

In an aspect of the invention, the central electronic control unit comprises at least one database that stores at least one tuple of values, formed by an identifier for selecting a hashing algorithm hi and a hashing algorithm.

In other words, the database allows an identifier for selecting a hashing algorithm hi to be associated with a stored hashing algorithm.

In one example, the hashing algorithm is selected from among: the SHA algorithm, the MD5 algorithm, the AES algorithm and the TDES algorithm. However, other hashing algorithms can be used without requiring substantial modifications to an aspect of the invention.

In step 110, the specific electronic control unit is used to generate an identifier for selecting a hashing algorithm hi.

In a particular embodiment of step 110, the identifier for selecting a hashing algorithm hi is a random index that is associated with a specific position in a predetermined list of hashing algorithms.

In this particular embodiment, a memory of the specific electronic control unit stores the list.

In step 120, the specific electronic control unit is used to acquire at least one hidden parameter K that is common to the central electronic control unit and to the specific electronic control unit. This parameter K is an evolutive parameter, like a rolling code, that evolves according to the same evolution law, both in the specific electronic control unit and in the central electronic control unit.

In a particular embodiment of step 120, the common parameter K is selected as a value produced by a generator device from among: a counter, a clock and a pseudo-random generator.

The common parameter K is known to the central electronic control unit and to the specific electronic control unit. To this end, the central electronic control unit and the specific electronic control unit each comprise a generator of the aforementioned type, which independently operate at the same time in each of the parts involved in exchanging messages.

To this end, a prior initialization phase can be provided, during which the central electronic control unit and the specific electronic control unit can synchronize their respective values of the common parameter K, for example, by exchanging appropriate messages. After this initial synchronization, the parameter K evolves on each of the parts (specific control unit and central control unit), according to the evolution law (for example, a counter increment, a clock time, or another more complex law). It should be noted that the law can also depend on the hashing algorithm hi (which can be identified in each part by an identifier or index, for example) and/or can depend on another index passed as a parameter in a frame of plaintext data contained in a message exchanged during this synchronization phase.

The two parts change the hidden parameter K internally, for example, during each transmission from the specific control unit, and periodically from the central control unit in order to take into account the fact that a frame can be lost. The evolution occurs according to a predefined law known to both parts. This allows for one or more possible transmission losses between the transmitter, namely, the specific electronic control unit, and the receiver, namely, the central electronic control unit. A person skilled in the art will appreciate that having the hidden parameter K, which is an evolutive parameter, allows a signature to be available that changes, even if the data passed in plaintext in the messages does not change. In other words, the signature is dynamic, which makes any exchanges of messages more robust to attacks, notably identity theft attacks.

In other examples of the particular embodiment of step 120, the value of the common parameter K is renewed, on one and/or the other of the parts involved in exchanging messages, according to predetermined intervals or when a particular context occurs.

In this way, the central electronic control unit and the specific electronic control unit are always aware of the value of the common parameter K, even following the loss of messages between the central electronic control unit and the specific electronic control unit.

In step 130, the specific electronic control unit is used to generate a digital hashing fingerprint E of the combination of the plaintext message M and of the common parameter K, on the basis of the identifier for selecting a hashing algorithm hi.

It should be noted that the specific electronic control unit stores the set of hashing algorithms that can be used in a memory, in relation to an identification index for each hashing algorithm.

It also should be noted that the digital hashing fingerprint E takes into account the common parameter K, whereas said common parameter K does not form part of the plaintext message. Thus, the common parameter K has virtually been added to the plaintext message M, before generating the first digital hashing fingerprint E.

In a particular embodiment of step 130, the first digital hashing fingerprint E is encrypted with a secret private key known to the specific electronic control unit.

In one example of the embodiment of step 130, the secret private key of a public key/secret private key pair is used, depending on a parameter for selecting an asymmetric encryption key. In another embodiment, the public key contained in the specific control unit is exchanged following a request from the central control unit to this specific control unit.

In other words, in this particular embodiment, an asymmetric encryption system is used, of a type known per se, which uses two different keys. In particular, such a system can use a pair made up of a secret private key, which is used for encryption, and a public key, which is used for decryption. However, in an aspect of the invention, one or more public/private key pairs is/are used.

Figure 3:
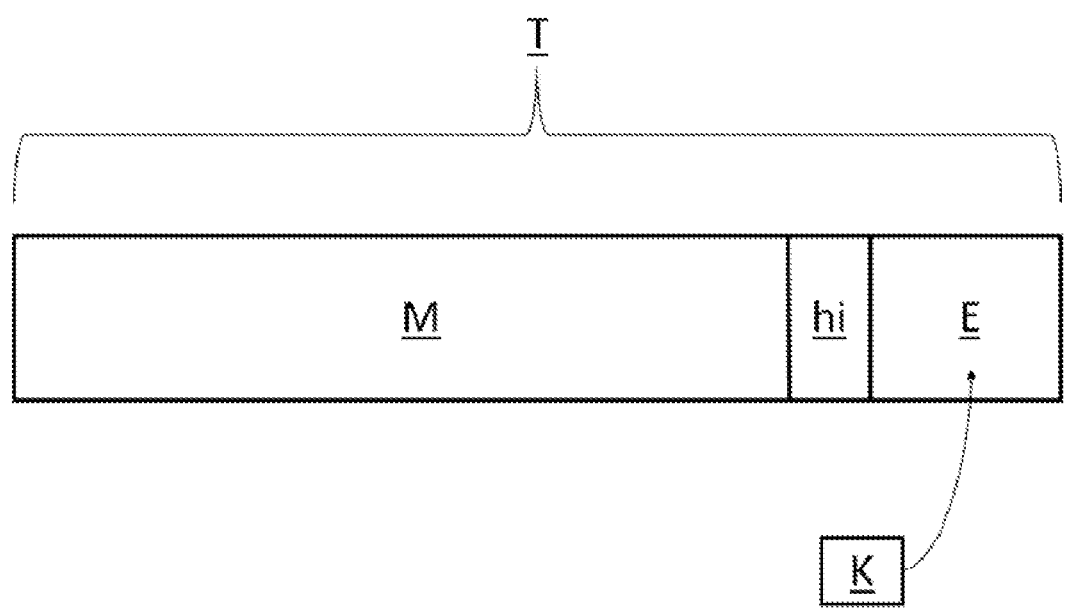
FIG. 3 shows a data frame according to an aspect of the invention.

In step 140, the specific electronic control unit is used to form a data frame T (see FIG. 3) that includes the plaintext message M, the identifier for selecting a hashing algorithm hi and the first digital hashing fingerprint E.

It should be noted that the data frame T does not include the common parameter K, whereas the first digital hashing fingerprint E takes it into account.

It is this "hidden field" mechanism that prevents the data frame T from being replayed by a malicious third party who has intercepted it. Since the common parameter K is different each time it is sent, it is not possible to replay an intercepted data frame as is.

In an example of the particular embodiment of step 130, the parameter for selecting an asymmetric encryption key is introduced into the data frame T.

In a particular embodiment of step 140, a CRC field is deleted from the plaintext message M that contains a CRC ("Check Redundancy Code") sequence, before forming the data frame T.

Indeed, with the mechanism of an aspect of the invention, and notably the use of a hashing function, a CRC field in the plaintext message, if present, is no longer necessary, as this information is redundant.

In step 150, the specific electronic control unit is used to send the data frame T to the central electronic control unit.

In an example of the particular embodiment of step 110, the random index is generated before each data frame T is sent.

In a particular embodiment of step 150, a wireless connection is established between the specific electronic control unit and the central electronic control unit, for transmitting the data frame T. As an alternative embodiment, the data frame T also can be transmitted in non-connected mode, for example, in broadcast mode, for example, in a message of the "Advertising" type.

In one example, the wireless connection is a Bluetooth connection.

In another particular embodiment, the wireless connection is maintained during all or part of the implementation of the method 100.

Figure 2:
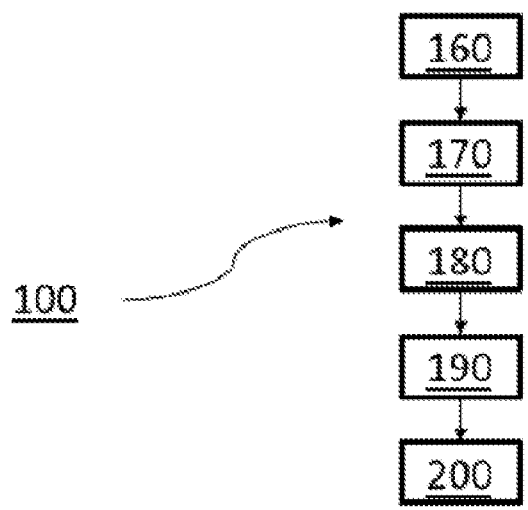
FIG. 2 shows a method according to an aspect of the invention when it is implemented on a central electronic control unit.

In one embodiment, illustrated in FIG. 2, the method continues on the central electronic control unit.

In particular, in step 160, the central electronic control unit is used to extract the plaintext message M and the identifier for selecting a hashing algorithm hi from the data frame T.

In step 170, the central electronic control unit is used to acquire the parameter K common to the central electronic control unit and to the specific electronic control unit, as mentioned above in relation to step 120 implemented on the specific electronic control unit.

Notably, the common parameter K can be provided by a counter, a clock or a pseudo-random generator. By way of a reminder, both parts, namely, the central electronic control unit and the specific electronic control unit, cause this parameter K to evolve internally according to a predefined law.

In an example of the particular embodiment of step 170, the value of the common parameter K is renewed according to predetermined intervals or during a particular context.

In step 180, the central electronic control unit is used to generate a digital hashing fingerprint, or verification fingerprint E', of the combination of the plaintext message M and of the common parameter K, on the basis of the identifier for selecting a hashing algorithm hi.

In a particular embodiment of step 180, the hashing algorithm associated with the identifier for selecting a hashing algorithm hi is sought in the database before generating this verification fingerprint E'.

To this end, it should be noted that the central electronic control unit stores all the hashing algorithms that can be used in a memory, with said memory being indexed by an index, to which the identifier for selecting a hashing algorithm hi is compared in order to find the hashing function to be applied.

In step 190, the central electronic control unit is used to compare the first digital hashing fingerprint E received from the specific electronic control unit and the verification digital fingerprint E' computed in the central electronic control unit.

In a particular embodiment of step 190, the received digital hashing fingerprint E is decrypted with a public key of the specific electronic control unit that is associated with the secret private key of the specific electronic control unit.

In an example of the particular embodiment of step 190, the public key of the public key/secret private key pair is used, depending on the parameter for selecting an asymmetric encryption key that is extracted from the data frame T.

In step 200, the central electronic control unit may or may not use the measurement data of the plaintext message M depending on the result of the comparison.

Thus, if the first digital fingerprint E and the second digital fingerprint E' are equal, then it is possible to guarantee that the identity of the specific electronic control unit has not been usurped and that the central electronic control unit can take into account the measurement data sent by the specific electronic control unit. Otherwise, this data is ignored by the central electronic control unit.

An aspect of the invention can be the subject of numerous alternative embodiments and applications other than those described above. In particular, unless otherwise indicated, the various structural and functional features of each of the embodiments described above should not be considered to be combined and/or closely and/or inextricably linked to one another, but rather as simple juxtapositions. Furthermore, the structural and/or functional features of the various embodiments described above can be the subject, in whole or in part, of any different juxtaposition or any different combination.

The invention claimed is:

1. A method for preventing identity theft for a specific electronic control unit of a motor vehicle, when the specific electronic control unit sends a plaintext message which contains measurement data to a central electronic control unit of the motor vehicle, the central electronic control unit comprising at least one database that stores at least one tuple of values formed by an identifier for selecting a hashing algorithm and a hashing algorithm, the method comprising, when implemented on the specific electronic control unit:
generating an identifier for selecting a hashing algorithm;
acquiring at least one evolutive parameter common to the central electronic control unit and the specific electronic control unit;
generating a first digital hashing fingerprint of the combination of the plaintext message and of the common parameter, from the identifier for selecting the hashing algorithm;
forming a data frame that includes the plaintext message, the identifier for selecting a hashing algorithm and the first digital hashing fingerprint; and
sending the data frame to the central electronic control unit.

2. The method as claimed in claim 1, further comprising, implemented on the central electronic control unit, in response to receiving the data frame:
extracting the plaintext message and the identifier for selecting the hashing algorithm from the data frame;
acquiring the evolutive parameter common to the central electronic control unit and the specific electronic control unit;
generating a second digital hashing fingerprint of the combination of the plaintext message and of the common parameter, from the identifier for selecting the hashing algorithm;
comparing the first digital hashing fingerprint and the second digital hashing fingerprint; and
using the measurement data of the plaintext message depending on the comparison.

3. The method as claimed in claim 2, further comprising:
encrypting, by the specific electronic control unit, the first digital hashing fingerprint with a secret private key of the specific electronic control unit, before forming the data frame; and
decrypting, by the specific electronic control unit, the first digital hashing fingerprint with a public key of the specific electronic control unit that is associated with the secret private key of the specific electronic control unit, before comparing the first digital hashing fingerprint and the second digital hashing fingerprint.

4. The method as claimed in claim 3, wherein:
the secret private key of a public key/secret private key pair is used, depending on a parameter for selecting an asymmetric encryption key that is introduced into the data frame; and
the public key of the public key/secret private key pair is used, depending on the parameter for selecting an asymmetric encryption key that is extracted from the data frame.

5. The method as claimed in claim 1, further comprising:
deleting, by the specific electronic control unit, a CRC field of the plaintext message that contains a CRC sequence, before forming the data frame.

6. The method as claimed in claim 2, further comprising:
searching, by the central electronic control unit, in the database for the hashing algorithm associated with the identifier for selecting the hashing algorithm, before generating the second digital hashing fingerprint.

7. The method as claimed in claim 1, wherein, on the specific electronic control unit, the identifier for selecting the hashing algorithm is a random index that is associated with a specific position in a predetermined list of hashing algorithms, with the list being stored in a memory of the specific electronic control unit.

8. The method as claimed in claim 7, wherein the random index is generated before sending each data frame.

9. The method as claimed in claim 1, wherein the common parameter is selected from among: a counter, a pseudo-random generator and a clock.

10. The method as claimed in claim 9, wherein, on the specific electronic control unit and on the central electronic control unit, the value of the common parameter is renewed at predetermined intervals.

* * * * *